Jan. 11, 1949.   K. E. McCONNAUGHAY   2,458,617
DRIER
Filed March 10, 1943

INVENTOR.
KENNETH E. McCONNAUGHAY,
BY
ATTORNEYS.

Patented Jan. 11, 1949

2,458,617

UNITED STATES PATENT OFFICE 2,458,617

DRIER

Kenneth E. McConnaughay, West Lafayette, Ind.

Application March 10, 1943, Serial No. 478,609

4 Claims. (Cl. 34—216)

It is the object of my invention to produce a drier, and more particularly a drier suitable for use in the drying of crushed stone or other similar material used as an aggregate in paving compositions. More specifically, it is my object to produce a drier which can be simply and economically constructed, which for its capacity will be relatively light in weight, and which will dry aggregate quickly and with a relative low expenditure of power. A further object of my invention is to produce a machine which in addition to drying the material passed through it will also serve to disintegrate any agglomerated lumps in such material.

In carrying out my invention, I feed the aggregate to be dried through the lower portion of a housing, the upper portion of which is heated and ventilated. Within the housing are one or more horizontally disposed shafts each of which carries a multiplicity of outwardly projecting arms. Means are provided for rotating such shafts at a high rate of speed, and the shafts are positioned so that as they rotate the arms will engage the aggregate in the lower portion of the housing and throw it upwardly through the heated atmosphere in the upper portion of the housing. Desirably the rate of shaft rotation is great enough so that the aggregate will be impelled with such a velocity that it will strike the walls of the housing with considerable force.

Figure 1:
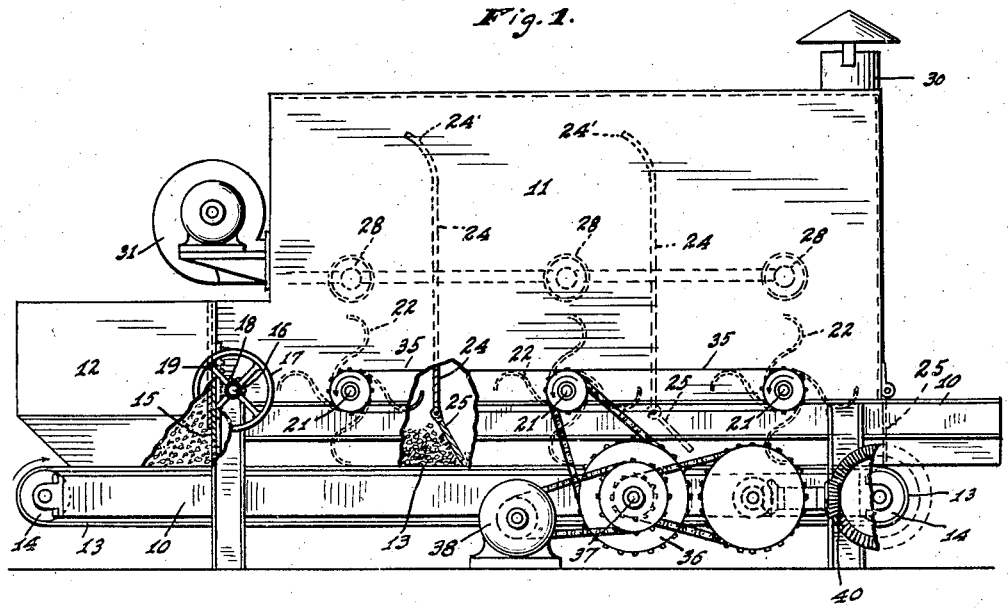
Figure 2:
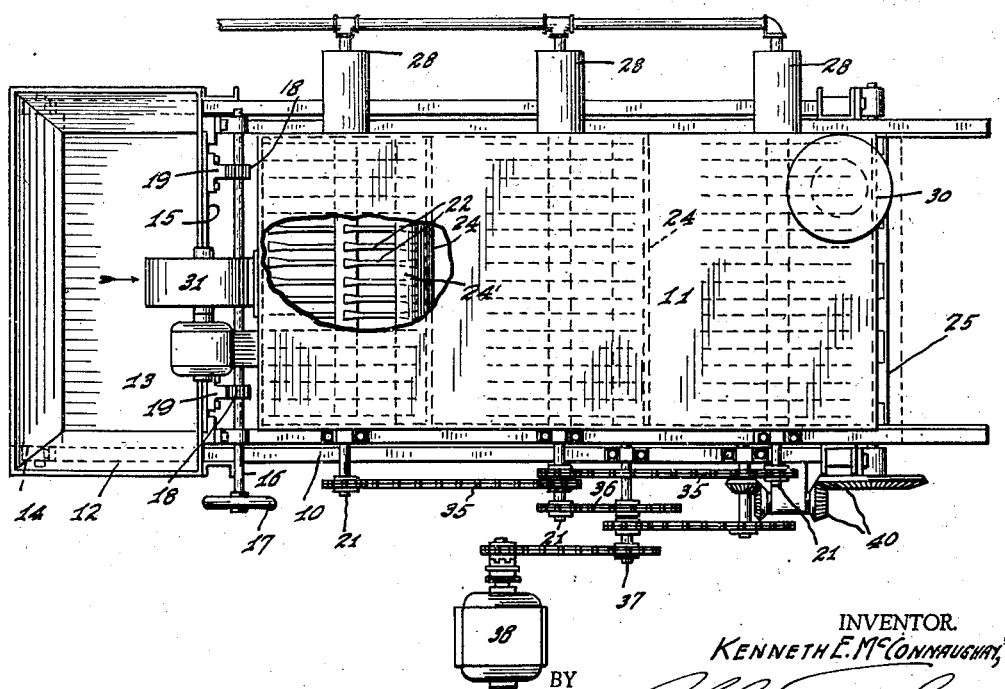

The accompanying drawing illustrates my invention, Fig. 1 being a side elevation and Fig. 2 a top plan of the complete drier, portions of the structure being broken away in each view in order to illustrate the construction more clearly.

The drier illustrated in the drawing comprises a frame 10 which supports a drying housing 11 and a feed hopper 12. The bottoms of the housing 11 and hopper 12 are formed by the upper stretch of a belt conveyor 13 which passes around rolls 14 located at opposite ends of the frame and which moves in such a direction that it will carry aggregate from the hopper 12 into the housing 11. A gate 15 vertically adjustable toward and away from the upper stretch of the conveyor 13 serves to regulate the rate at which the aggregate is fed from the hopper into the housing. The means employed for adjusting the gate 15 may take any desired form, that shown in the drawing comprising a transversely extending shaft 16 provided with an operating hand-wheel 17 and with pinions 18 which mesh with racks 19 vertically movable with the gate 15.

One or more shafts 21 extend transversely of the housing in parallel relation above the upper stretch of the conveyor 13. As shown, there are three such shafts 21; but the number may vary as desired. Each shaft carries within the housing 11 a plurality of axially extending rows of generally radial arms 22 of such a length that in the rotation of the shaft their outer ends will pass close to the upper stretch of the conveyor 13. Desirably, each of the arms 22 is forwardly concave in the direction of rotation so that each arm as it rotates will tend to elevate the loose particles of aggregate on the conveyor.

Where, as indicated in the drawing, a plurality of the shafts 22 are provided, the housing is desirably equipped with vertical partitions 24 located between adjacent shafts 21 in a position to clear the outer ends of the arms 22. The lower edge of each of such partitions is spaced upwardly from the conveyor 13 and carries a swinging gate 25 extending substantially completely across the housing and having a height such that its lower edge will just clear the conveyor 13. A similar gate 25 is provided in the end wall of the housing adjacent the discharge end of the conveyor.

Any convenient means may be employed for heating the atmosphere in the upper portion of the housing 11. Where the partitions 24 extend upwardly well into the upper portion of the housing, it is desirable to provide a heating means, such as a gas or oil burner 28, in each of the compartments into which the interior of the housing 11 is divided by the partitions 24. For the purpose of carrying away moisture vaporized by the burners 28, the housing 11 is provided with a vent stack 30, and may also be equipped with a blower 31, the vent stack and blower being located so as to provide a forced circulation of air through the housing. The partitions 24 terminate short of the top wall of the housing, to permit the free passage of air from the blower to the stack, and their upper edges are desirably bent, as indicated at 24', to extend upwardly and rearwardly relative to the direction of movement of the upper stretch of the conveyor 13.

The various shafts 21 and at least one of the rollers 14 are driven from any suitable source of power. As shown, the shafts 21 are interconnected by chain drives 35 so that they will all rotate at the same speed, and the center shaft 21 is driven through a speed-increasing drive 36 from a shaft 37 connected to an engine or driving motor 38. A speed reducing power-transmission mechanism 40 of any convenient type interconnects the shaft 37 with the roll 14 at the discharge end of the housing. The drives are so designed that the tips of the arms 22 will move at a linear velocity many times that of the conveyor 13. The speed of the shafts 21 should be at least great enough to throw the material being dried into the heated atmosphere in the upper part of the housing and desirably great enough to cause the particles of such material to be impelled with considerable force against the housing walls and partitions. The shafts 21 may rotate in either direction, but as shown rotate so that the ends of the arms 22 at the lower most part of their path of travel, move in the same direction as the conveyor.

In operation, the burners 28 are ignited, the hopper is filled with aggregate to be dried, and the blower 31 and driving means 38 are started. As the conveyor moves, aggregate is carried from the hopper into the bottom of the housing 11. As this aggregate reaches the vicinity of the first shaft 21, the arms 22 pick it up and throw it upwardly again and again into the heated atmosphere created by the first burner 28. As more and more aggregate is fed into the first compartment of the housing, some of it begins to collect on the conveyor 13 beyond the range of the rotating arms 22 and to accumulate against the face of the swinging gate 25. Eventually, aggregate accumulating at this point will create sufficient pressure on the gate 25 to cause it to swing against the force of gravity, thus permitting such aggregate to be carried by the conveyor beneath the swinging gate 25 into the next compartment, where the arms 22 on the second shaft pick it up and throw it upwardly into the heated atmosphere. In similar manner, the aggregate progresses from compartment to compartment beneath each swinging gate 25 until it escapes from the last compartment and is discharged. The partitions 24 and swinging gates 25 prevent any particles of aggregate from being thrown immediately completely through the casing without having been subjected to the action of the drying atmosphere, while the inclined portion 24' at the upper edge of each partition prevents the particles from being thrown into the next compartment over the top of the partition.

The machine described acts not only as a drier, but also serves to break up any agglomerated lumps in the material being treated; for the rapidly moving arms strike the material with considerable force. In addition, some crushing action may occur between the tips of the arms and the conveyor.

Since the heat is applied only to the upper portion of the housing, moving parts such as the conveyor and the shafts 21 may remain comparatively cool. In the heated upper portion of the casing, each aggregate particle is completely surrounded by a drying atmosphere, and is free from contact with other particles or with a supporting surface. The movement of each particle while in the upper portion of the housing increases the volume of heated air with which it is brought into intimate contact, and thus speeds the drying action.

The abrupt change of velocity to which the aggregate particles are subjected is a further aid in drying; for surface moisture tends to be thrown from the particles each time their velocity changes. Where air velocity through the casing is relatively high, a large proportion of the moisture freed from the aggregate in this manner may be carried off by the moving air in an unvaporized state.

When, as is preferable, the shafts 21 are rotated at a speed sufficient to cause the aggregate particles to impinge with considerable force against the partitions and side and top walls of the housing 11, the resulting impacts aid in the breaking up of agglomerated lumps and in freeing the particles from surface moisture.

The design of the drier is extremely flexible, great freedom of choice being permitted in respect to the number and arrangement of burners and in respect to the number and arrangement of air-admission and air-outlet openings.

I claim as my invention:

1. A drier for crushed stone and the like, comprising a horizontally elongated housing having side walls and a top wall and provided at opposite ends with inlet and discharge openings for the material to be dried, a conveyor in the lower portion of said housing for conveying material from the inlet opening to the discharge opening, said housing being provided above said conveyor and near opposite ends with air inlet and air discharge openings, means for causing air to flow upwardly thrown material from passing directly through said housing above said conveyor from the air inlet opening to the air discharge opening, means for heating such air, a plurality of spaced rotatable shafts extending horizontally across said housing above and transversely of said conveyor, each of said shafts being provided with a plurality of axially extending rows of generally radial arms, said arms having a length such that their outer ends will pass close to said conveyor as the shaft rotates, and means for rotating said shaft at a speed such that said arms will throw material on said conveyor upwardly into the heated upper portion of the housing, and a rigid vertical partition extending transversely of said housing between adjacent shafts to divide the interior of the housing into compartments, said partition being arranged to permit communication between said compartments adjacent the top wall of the housing and having its lower edge spaced above said conveyor to provide an opening through which the material being dried can pass from one compartment to the other on the conveyor, said partition between its lower edges and a point adjacent the top wall of the housing being imperforate to intercept material thrown upwardly by the arms on the shaft in one compartment and thereby prevent such upwardly thrown material from passing directly into the adjacent compartment.

2. The invention set forth in claim 1 with the addition of a swinging gate hinged adjacent the lower edge of the partition and extending downwardly therefrom to a point adjacent the conveyor.

3. A drier for crushed stone and the like, comprising a horizontally elongated housing having side walls and a top wall and provided at opposite ends with inlet and discharge openings for the material to be dried, a conveyor in the lower portion of said housing for conveying material from the inlet opening to the discharge opening, said housing being provided above said conveyor and near opposite ends with air inlet and air discharge openings, means for causing air to flow through said housing above said conveyor from the air inlet opening to the air discharge opening, means for heating such air, a plurality of spaced rotatable shafts extending horizontally across said housing above and transversely of said conveyor, each of said shafts being provided with a plurality of axially extending rows of generally radial arms, said arms having a length such that their outer ends will pass close to said conveyor as the shaft rotates, and means for rotating said shaft at a speed such that said arms will throw material on said conveyor upwardly and cause it to impinge violently against the walls of the housing, and a rigid vertical partition extending transversely of said housing between adjacent shafts to divide the interior of the housing into compartments, said partition being arranged to permit communication between said compartments adjacent the top wall of the housing and having its lower edge spaced above said conveyor to provide an opening through which the material being dried can pass from one compartment to the other on the conveyor, said partition between its lower edge and a point adjacent the top wall of the housing being imperforate to intercept material thrown upwardly by the arms on the shaft in one compartment and thereby prevent such upwardly thrown material from passing directly into the adjacent compartment.

4. The invention as set forth in claim 3 with the addition of a swinging gate hinged adjacent the lower edge of the partition and extending downwardly therefrom to a point adjacent the conveyor.

KENNETH E. McCONNAUGHAY.

REFERENCES CITED

The following references are of record in the file of this patent:

UNITED STATES PATENTS

| Number | Name | Date |
|---|---|---|
| 423,140 | Espinosa | Mar. 11, 1890 |
| 426,361 | Buttner et al. | Apr. 22, 1890 |
| 473,263 | Proctor | Apr. 19, 1892 |
| 675,070 | Sargent | May 28, 1901 |
| 847,038 | Ayres | Mar. 12, 1907 |
| 966,862 | Ruffin | Aug. 9, 1910 |
| 1,037,254 | Hopkins | Sept. 3, 1912 |
| 1,147,203 | Andrews | July 20, 1915 |
| 1,259,675 | Sargent | Mar. 19, 1918 |
| 1,289,542 | Rapp | Dec. 31, 1918 |
| 1,460,519 | Wadsworth | July 3, 1923 |
| 1,668,446 | Anderson | May 1, 1928 |
| 1,735,396 | Hiller | Nov. 12, 1929 |
| 1,770,409 | Kehoe | July 15, 1930 |
| 1,788,099 | Fulmer | Jan. 6, 1931 |
| 1,960,616 | Bartram | May 29, 1934 |
| 2,017,586 | Cottee | Oct. 15, 1935 |
| 2,035,716 | Peek | Mar. 31, 1936 |
| 2,110,850 | Symons | Mar. 8, 1938 |
| 2,202,151 | Hickley, Jr. | May 28, 1940 |
| 2,308,508 | Harrington | Jan. 19, 1943 |

FOREIGN PATENTS

| Number | Country | Date |
|---|---|---|
| 22,726 | Australia | Jan. 25, 1906 |
| 81,051 | Germany | May 9, 1895 |
| 535,718 | Germany | Oct. 14, 1931 |
| 690,651 | France | June 24, 1930 |

Certificate of Correction

Patent No. 2,458,617. January 11, 1949.

KENNETH E. McCONNAUGHAY

It is hereby certified that error appears in the printed specification of the above numbered patent requiring correction as follows:

Column 4, line 21, claim 1, strike out the words "upwardly thrown material from passing directly";

and that the said Letters Patent should be read with this correction therein that the same may conform to the record of the case in the Patent Office.

Signed and sealed this 14th day of June, A. D. 1949.

[SEAL]

THOMAS F. MURPHY,
*Assistant Commissioner of Patents.*